(12) United States Patent
Wobben

(10) Patent No.: US 7,175,390 B2
(45) Date of Patent: Feb. 13, 2007

(54) SWITCHING APPARATUS WITH AN ACTUATING SHAFT

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/729,821

(22) Filed: Dec. 5, 2003

(65) Prior Publication Data

US 2004/0165987 A1    Aug. 26, 2004

Related U.S. Application Data

(63) Continuation of application No. PCT/EP02/04484, filed on Apr. 24, 2002.

(30) Foreign Application Priority Data

Jun. 7, 2001    (DE) ................................ 101 27 454

(51) Int. Cl.
*F03D 11/00*    (2006.01)
(52) U.S. Cl. .............................. 416/61; 416/31; 200/18; 200/19.03; 200/19.13; 200/19.2; 200/33 B; 200/573; 200/574
(58) Field of Classification Search ................... 416/31, 416/61; 200/17 R, 18, 19.03, 19.13, 19.18, 200/19.2, 36, 38 R, 33 B, 573–574
See application file for complete search history.

(56) References Cited

U.S. PATENT DOCUMENTS

| | | | | |
|---|---|---|---|---|
| 843,902 A | * | 2/1907 | Lewis ........................... | 200/18 |
| 845,368 A | * | 2/1907 | Mueller ....................... | 200/19.2 |
| 1,046,846 A | * | 12/1912 | Ordway et al. ........... | 200/19.03 |
| 1,102,562 A | * | 7/1914 | Anderson ................. | 200/19.18 |
| 2,906,832 A | * | 9/1959 | Foster et al. ................. | 200/18 |
| 3,337,700 A | * | 8/1967 | Lace ......................... | 200/38 R |
| 4,490,093 A | | 12/1984 | Chertok et al. | |
| 4,962,290 A | * | 10/1990 | Nelson et al. ............. | 200/574 |
| 5,298,700 A | | 3/1994 | Champagne et al. | |
| 5,865,599 A | * | 2/1999 | Pruden et al. ............. | 416/61 |
| 6,794,770 B2 | * | 9/2004 | Kirby ......................... | 200/18 |

FOREIGN PATENT DOCUMENTS

| | | | | |
|---|---|---|---|---|
| CH | 164626 A | * | 12/1933 | ............. 200/19.13 |
| CH | 333331 A | * | 11/1958 | ................ 200/19.2 |
| DE | 714140 A | * | 11/1941 | ............. 200/19.18 |
| DE | 9013386 U | * | 11/1990 | |
| DE | 39 30 821 A1 | | 3/1991 | |
| DE | 29520792 U1 | * | 3/1996 | |
| EP | 0 539 005 | | 4/1993 | |
| EP | 0 942 168 A2 | | 9/1999 | |
| GB | 555439 | | 8/1943 | |

* cited by examiner

*Primary Examiner*—Christopher Verdier
(74) *Attorney, Agent, or Firm*—Seed IP Law Group PLLC

(57) ABSTRACT

A switching apparatus having an actuating shaft, an actuator, at least one switch and a housing. A switching apparatus is in the form of at least one actuating guide which is connected with a first actuating guide portion to the actuating shaft and which with a second actuating guide portion at least partially embraces the actuating shaft at a predetermined spacing, wherein provided on the convex side of the second actuating guide portion is an actuating track for the switch or switches, insofar as at least one predetermined position the spacing between the outer peripheral edge and the actuating shaft is greater for a predetermined arcuate dimension than at other positions of the second actuating guide portion.

29 Claims, 6 Drawing Sheets

SWITCHING APPARATUS WITH AN ACTUATING SHAFT

CROSS-REFERENCE TO RELATED APPLICATION

This application claims priority from the International Application PCT/EP02/04484, filed Apr. 24, 2002, which application is incorporated herein by reference in its entirety.

TECHNICAL FIELD

The present invention concerns a switching apparatus comprising an actuating shaft, an actuator, at least one switch and a housing.

BACKGROUND OF THE INVENTION

Switching apparatuses of that kind are generally known in particular in the form of cam switches and are used in the most widely varying pieces of equipment and for the most widely varying functions. In that respect one or more cam discs are arranged on an actuating shaft. Those cam discs are distinguished in particular in that their outer periphery departs from a circular shape at at least one location and has either a cam dip, that is to say a reduced spacing of the outer peripheral edge with respect to the actuating shaft, or a raised cam lobe, that is to say an increased spacing of the peripheral edge with respect to the actuating shaft.

Now, an actuating lever extending along such a periphery of a camshaft of such a configuration, for a switch or a contact spring itself, opposite which there is a further contact in the radial direction of the cam disc, can be actuated by the cam disc and can thus trigger a switching operation.

Depending on the situation of use involved, it is possible to provide a single cam disc which actuates one or more switches, in a complete revolution. Alternatively, it is also possible to provide on a shaft, a plurality of mutually spaced cam discs which then naturally can actuate a plurality of switches, in accordance with the configuration of cam dips and/or raised cam lobes. In that way, a plurality of different switches can be actuated automatically in a predetermined relationship with each other.

A disadvantage with those known cam switches however is that, for example as a consequence of inevitable tolerances, the precision of such switching mechanisms cannot be increased just as may be desired, and frequently there is a conflict between the requirement for a high level of precision and at the same time a small installation size.

SUMMARY OF THE INVENTION

Therefore one object of the present invention is to develop a switching apparatus of the kind set forth in the opening part of this specification, in such a way that the switching accuracy and the level of resolution, that is to say the possibility of securely differentiating between two different switching positions, is improved.

In that respect, the invention is based on the realization that the level of resolution, precisely in a rotational movement, depends in particular on the length of the arcuate portion during the rotation and thus on the outer periphery of the cam disc.

In accordance with the invention therefore a switching apparatus of the kind set forth in the opening part of this specification is further developed by the actuator being in the form of at least one arcuate actuating guide which is connected with a first actuating guide portion to the actuating shaft and which with a second actuating guide portion at least partially embraces the actuating shaft at a predetermined spacing, wherein provided on the convex side of the second actuating guide portion is an actuating track for the switch or switches, insofar as at at least one predetermined position the spacing between the outer peripheral edge and the actuating shaft is greater for a predetermined arcuate dimension than at other positions of the second actuating guide portion.

By virtue of that structure, the spacing of the second actuating guide portion from the actuating shaft determines the radius of the actuator and thus also the arcuate portion by which the actuator moves further by a predetermined distance, upon a rotary movement of the actuating shaft. As the relationship between radius and periphery of a circle is linear, the length of the arcuate portion rises for a predetermined angle to the same extent as the radius.

In a preferred embodiment of the invention the second actuating guide portion is of a predetermined length parallel to the actuating shaft, and has a plurality of actuating tracks for a plurality of switches, said tracks being arranged distributed in mutually juxtaposed relationship over said length. In that way, a suitably designed actuating guide with accordingly also only one fixing on the actuating shaft is sufficient for the actuation of a plurality of switches in a predeterminable manner.

A preferred feature of the present invention employs commercially available switches which are mounted to a first carrier plate. In that way, for example, mounting of the switches on the plate and wiring of the switches can be implemented before installation in the switching apparatus so that the carrier plate with the switches mounted thereon can finally be introduced as a structural unit into the switching apparatus.

Alternatively to mechanical switches or in addition thereto it is possible to use electronic switches. Those electronic switches are generally designed for a higher number of switching cycles than mechanical switches and thus have a higher level of safeguard against failure. Therefore, the operational reliability of the switching apparatus can be considerably increased by the redundant provision of mechanical and electronic switches. In that respect a suitable arrangement of the switches can restrict the structural size of the switching apparatus.

In a preferred development of the invention, the actuating shaft is passed through the base plate of the housing so that the actuating shaft is rotatable from the outside. It is possible to arrange at the end of the actuating shaft, which is at the inside of the housing, a rotary sender which represents the position of the shaft in a predeterminable manner independently of the actuation of a switch or a plurality of switches.

In order to be able to operate the rotary sender with the highest possible degree of freedom from mechanical loadings, a preferred embodiment of the invention provides that the rotary sender shaft is in the form of an actuating shaft for the rotary sender, separately from the actuating shaft for the actuating guide. In order to embody a connection which carries axial and radial forces but which is stiff in torsion, the actuating shaft and the rotary sender shaft are preferably connected by a spring bellows coupling.

In a preferred embodiment, that rotary sender is a potentiometer and provides a very simple structure. Alternatively the rotary sender can be an incremental sender which for example is integrated in the form of an autonomous structural unit into the switching apparatus and suitably codes the rotational information and outputs the coded information. In that way, the position of the shaft can be continuously ascertained and in addition in predeterminable positions, independently of the rotary sender, the switches can trigger given switching procedures, controlled by way of the actuating guide. That also makes it possible for example to embody a safety circuit which, even in the event of failure of the rotary sender, still permits triggering of given switching procedures when given angular positions are reached.

A predetermined minimum wall thickness of the cover hood, an in particular shear-resistant connection between the cover hood and the base plate and naturally suitable fixing of the switching apparatus provide a sufficiently high level of load-carrying capability in order for example also in the installation situation to withstand without damage a short-term high shear loading such as a lateral blow and/or someone inadvertently treading thereon.

If the cover hood fits on the base plate in sealed relationship, that prevents moisture from penetrating into the interior of the switching apparatus. That permits reliable long-term operation. It will be appreciated that a seal can be provided between the base plate and the cover hood. In that respect, the fixing of the cover hood to the base plate can be such that the seal is disposed between the cover hood and the base plate and is biased by the cover hood.

Further advantageous embodiments of the invention are set forth in the appendant claims.

BRIEF DESCRIPTION OF THE DRAWINGS

Embodiments by way of example of the invention are described in greater detail hereinafter with reference to the drawings in which.

DETAILED DESCRIPTION OF THE INVENTION

Figure 1:
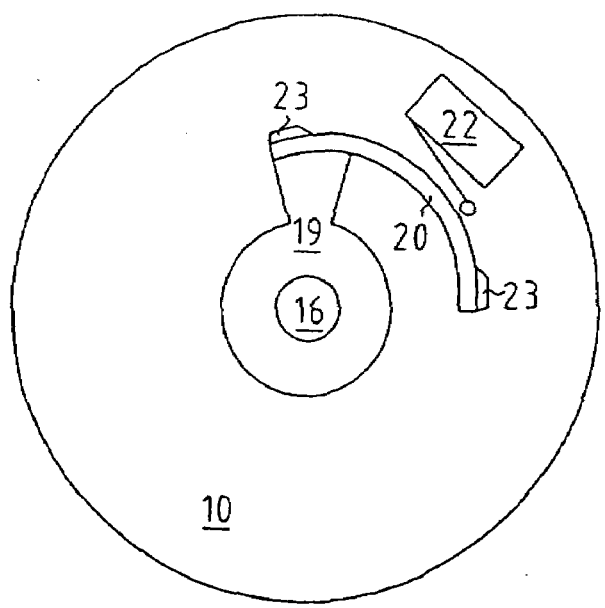
FIG. 1 is a simplified plan view of the base plate of a switching apparatus according to the invention in a first embodiment.

In FIG. 1, shown in the center of the base plate 10 is an actuating shaft 16; the position of the actuating shaft 16 can alternatively be eccentric. The actuating shaft passes through the base plate 10 and can be actuated from the side of the base plate 10, remote from the view shown in the drawing.

Fixed to the actuating shaft 10 is a first crank or actuating guide portion 19. That fixing can be for example in positively locking relationship, so that rotation of the actuating shaft 16 always entrains the first actuating guide portion 19.

The first actuating guide portion 19 is connected to a second actuating guide portion 20 by way of a leg shown in the Figure above the actuating shaft 16. That second actuating guide portion 20 has raised cam portions 23 at predetermined positions. Also shown at the convex side of that second actuating guide portion 20 is a switch 22 which is arranged in a housing and which has an actuating lever which is at a small spacing relative to the surface of the second actuating guide portion 20. In this case, the spacing between the actuating lever of the switch 22 and the second actuating guide portion 20 is less than the height of the two raised cam portions 23 with respect to the part, which is disposed therebetween, of the second actuating guide portion 20.

The first actuating guide portion 19 is entrained by a rotary movement of the actuating shaft 16 and thus the second actuating guide portion 20 also moves along under the actuating lever of the switch 22. As soon as one of the raised cam portions 23 reaches the actuating lever of the switch 22, that actuating lever is moved towards the switch 22 and the switch 22 is actuated. In that way, it is possible clearly to detect that the actuating shaft 16 has reached a predetermined position.

If now the actuating shaft 16 moves in the opposite direction, the raised cam portion 23 moves out from under the actuating lever of the switch 22 and the switch 22 can move back into its rest position again. This also makes it possible clearly to recognise an oppositely directed rotary movement of the actuating shaft 16.

The switching apparatus can include a plurality of switches along the direction of movement and/or the length of the second actuating guide portion.

Figure 2:
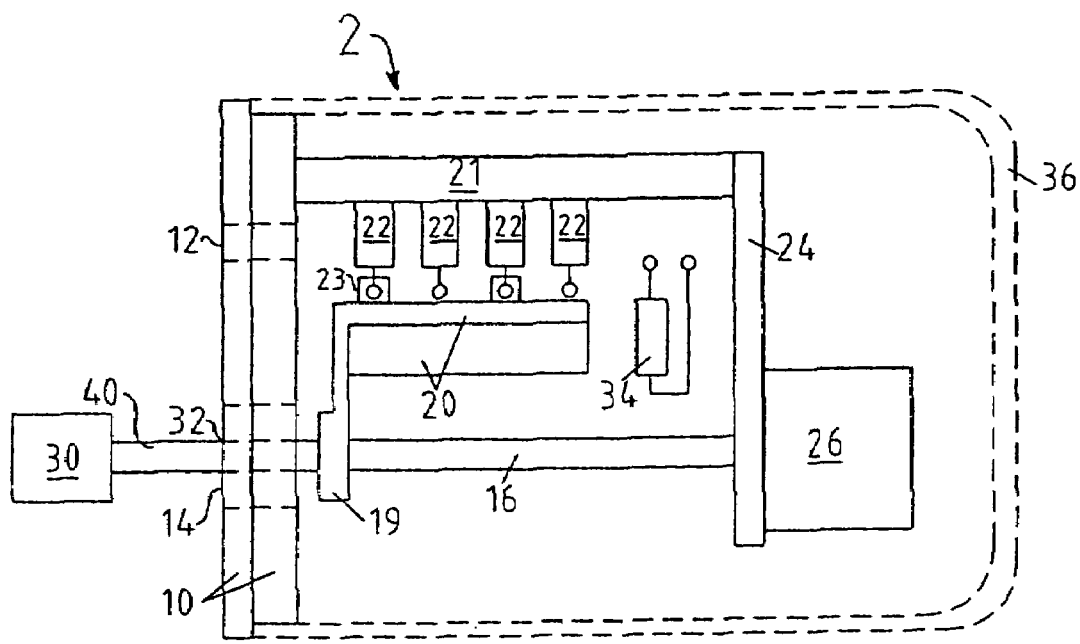
FIG. 2 is a side view of an open switching apparatus according to the invention in the first embodiment.

FIG. 2 shows a side view of an open switching apparatus according to the invention. A base plate 10 has a bearing seat 14 through which the actuating shaft 16 is passed. In this case the actuating shaft 16 can be supported for example in a ball-type rotational connection in the form of a bearing 32. In addition the base plate 10 has a through opening 12 as a cable ducting means, through which connecting cables can be passed out of the switching apparatus which in operation is closed. For sealingly closing those cable openings 12, it is possible to use gland packing boxes which are generally known and therefore not described in greater detail here.

In FIG. 2, the region to the right of the base plate is the region which, when the switching apparatus is in the final assembled condition, is covered by a cover hood 36 (shown in broken lines) and thus forms the interior of the switching apparatus while the region to the left of the base plate 10 is outside the housing of the switching apparatus.

It can be easily seen that the actuating shaft 16 extends a predetermined length outside the casing and ends in a connecting sleeve 30. By way of that connecting sleeve 30, the actuating shaft 16 can be non-rotatably connected to a further shaft, the rotational position of which is to be established.

At the inside of the base plate 10, a first actuating guide portion 19 of an actuating guide is arranged on the actuating shaft 16 in such a way that it is reliably entrained in the rotational movement of the actuating shaft 16. This can be achieved for example by a positively locking connection.

Connected to the first actuating guide portion 19 is a second actuating guide portion 20 which, in the present embodiment, extends at a predetermined spacing in the form of a segment of a circle in concentric relationship around the actuating shaft 16 (see in particular FIG. 1). In this case the length of that second actuating guide portion 20 is such that a plurality of actuating tracks are distributed over the length thereof, which tracks can actuate a plurality of mutually juxtaposed switches 22 separately from each other.

In addition, a first carrier plate 21 is fixed to the base plate 10 in such a way that it extends parallel to the actuating shaft 16 at a predetermined spacing. A plurality of switches 22 are fixed to that first carrier plate 21 in mutually juxtaposed relationship at such a spacing that the actuating lever of each switch 22 is disposed opposite a given actuating track of the second actuating guide portion 20. A rotary movement of the actuating shaft 16 provides that the first actuating guide portion 19 and therewith also the second actuating guide portion 20 are correspondingly entrained and raised cam portions 23 provided on the second actuating guide portion 20 at predetermined positions actuate the switches 22 (see in particular FIG. 1).

A second carrier plate 24 is mounted to the side of the first carrier plate 21, which is remote from the base plate, perpendicularly to the first carrier plate 21. That second carrier plate 24 carries an incremental sender 26.

That incremental sender 26 is in turn connected to the actuating shaft 16 and outputs the rotational position of the actuating shaft 16 in the form of a suitably coded electrical signal.

The rotary movement of the actuating shaft 16 always directly influences the incremental sender 26 so that the latter shows any rotation of the shaft in the form of electrical signals. Independently of the incremental sender, given predeterminable rotational positions of the actuating shaft 16 can be detected by virtue of the actuation of switches 22 as the position of raised cam portions 23 on the actuating track of the second actuating guide portion 20 permits corresponding actuation of the switches 22 independently of the incremental sender 26.

In order to compensate for excessive fluctuations in the operating conditions of that switching apparatus, it is possible to provide for example a heating resistor 34 which is switched on when necessary in order to heat up the interior of the switching apparatus by the conversion of electrical energy into heat.

The operation of mounting the cover hood 36 (shown in broken line in this Figure) to the base plate 10 can be effected for example by the cover hood 36, in the region near the base plate, having a female screwthread which can be screwed to a corresponding male screwthread on the base plate 10. Alternatively it is possible to provide screwthreaded rods (not shown for the sake of clarity) which extend from the base plate 10 parallel to the actuating shaft 16 beyond the incremental sender 26. In such a case, the cover hood 36, at the side remote from the base plate, can have bores through which those screwthreaded rods project by a predetermined length so that nuts can be screwed thereon from the exterior, to press the cover hood in its fit against the base plate 10.

In addition the fixing (also not shown) of the cover hood 36 can be effected by screws at the periphery of the cover hood 36, which for example either engage in the radial direction of the switching apparatus into corresponding screwthreaded bores in the base plate 10 or which engage through the base plate 10 in the axial direction into screwthreads of a suitable nature in the cover hood 36.

Figure 3:
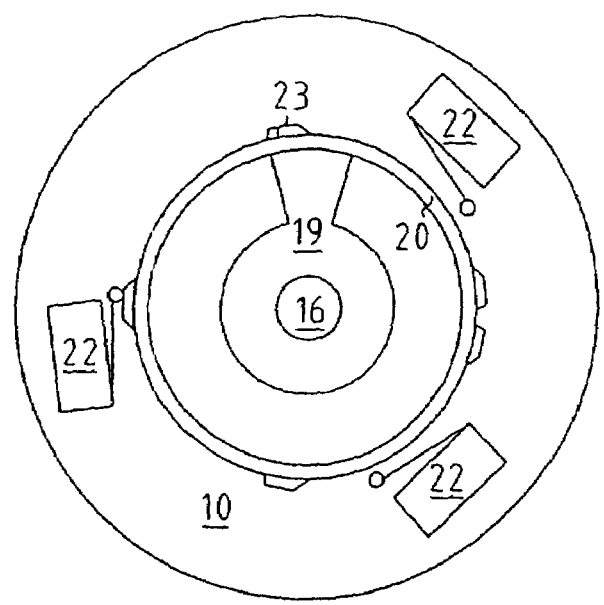
FIG. 3 is a simplified plan view of the base plate of a switching apparatus according to the invention in a second embodiment.
Figure 4:
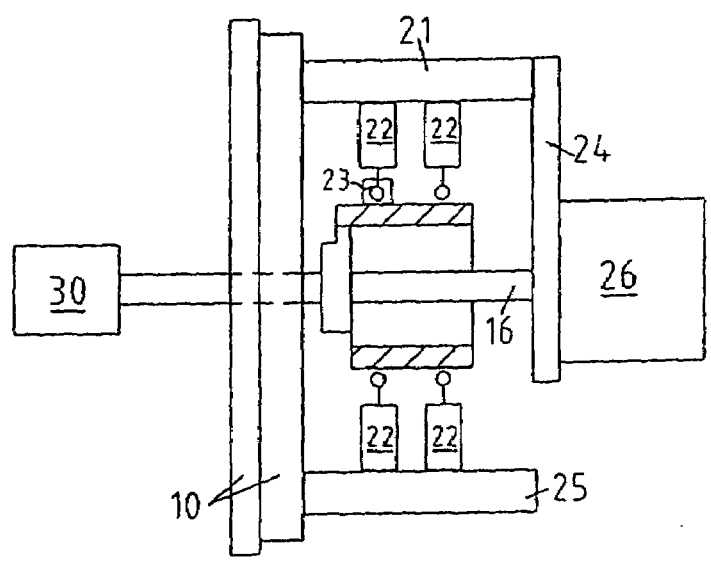
FIG. 4 is a side view of an open switching apparatus according to the invention in the second embodiment.

FIG. 3 shows a simplified plan view of the base plate of a second embodiment of a switching apparatus according to the invention and FIG. 4 shows a side view of this embodiment. As this embodiment and the embodiments described hereinafter are also based on the same principle as the first embodiment, in particular the differences in relation to the first embodiment will be referred to here.

In this second embodiment, the essential difference is that the second actuating guide portion 20 extends completely around the actuating shaft 16. In this case, the plane of the area enclosed by the second actuating guide portion 20 extends radially with respect to the actuating shaft 16.

Switches 22 are arranged at uniform spacings over the outside periphery, in dependence on the intended maximum rotary angle of the switching apparatus. In the illustrated embodiment the rotary angle does not exceed 120° and thus three switches can be distributed over the periphery (see in particular FIG. 3). That arrangement therefore permits a more compact structure for a switching apparatus according to the invention. In this respect, FIG. 4 shows an arrangement having a third carrier plate 25 on which two switches 22 are arranged.

The respective switching time derives from the position of the raised cam portions 23. In the case of two switches 22 as shown in FIG. 3, there are two raised cam portions 23 so that those switches 22 are actuated in both directions of rotation towards the end of the rotational travel, but at different positions and thus at different moments in time. The third switch illustrated at the left in the Figure is shown in the actuated condition. The raised cam portion 23 has urged the actuating lever towards the switch 22 and thus caused the switching operation. In that case that switch 22 is actuated approximately at the center of the rotational travel independently of the direction of rotation. It will be appreciated that any other combinations can be envisaged.

Figure 5:
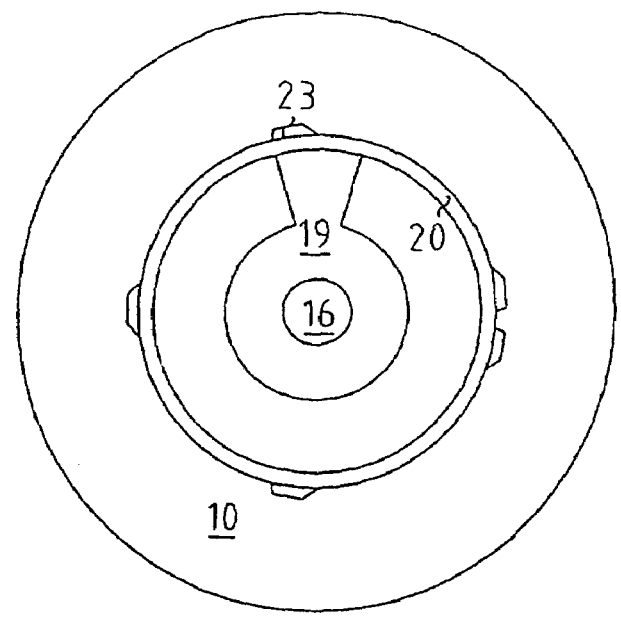
FIG. 5 is a simplified plan view of the base plate of a switching apparatus according to the invention in a third embodiment.
Figure 6:
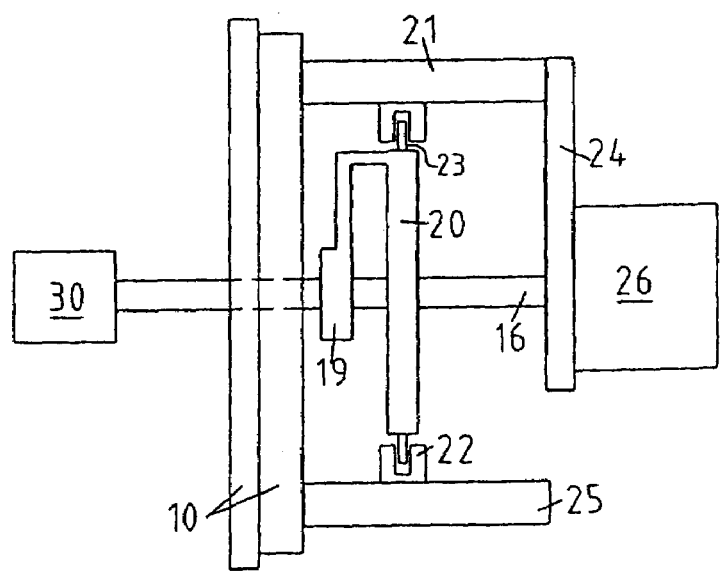
FIG. 6 is a side view of an open switching apparatus according to the invention in the third embodiment.

FIGS. 5 and 6 show a further embodiment in which optical switches, for example in the form of fork-type light barrier arrangements, are used in place of mechanical switches 22. It can be seen from FIG. 5 that the second actuating slide guide portion 20 again extends completely around the actuating shaft 16. In FIG. 6, the side view shows that the raised cam portions provided for triggering the switching cycles can here be markedly narrower than is required for reliable actuation of mechanical switches.

Figure 7:
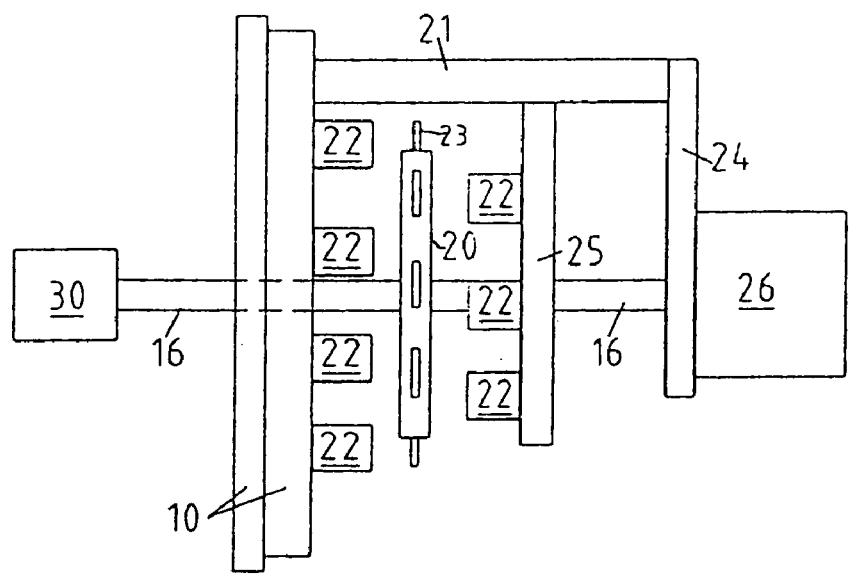
FIG. 7 is a side view of an open switching apparatus according to the invention in the fourth embodiment.

FIG. 7 shows a side view of a fourth embodiment of the switching apparatus according to the invention. In this case, instead of fork-type light barrier arrangements, reflection couplers are used as the switches 22 in order once again to produce corresponding signals by optical means. In order to avoid the switches 22 influencing each other in the case of a cam dip, the switches are arranged in two planes but in displaced relationship with each other, in such a way that no two switches 22 are disposed in opposite relationship. In that way, a suitable choice of the positions of the raised cam portions and the cam dips makes the structure of a switching apparatus according to the invention even more compact.

The mode of operation of a reflection coupler as a switch 22 differs in that respect from the mode of operation of a fork-type light barrier arrangement. In the case of the fork-type light barrier arrangement, the transmitter and the receiver are disposed separately in the mutually oppositely disposed fork arms. As long as no raised cam portion 23 interrupts that path, the switching operation is triggered. If a raised cam portion 23 is disposed between the transmitter and the receiver, the optical connection and therewith also the switching operation are interrupted. In the case of a reflection coupler, the transmitter and the receiver are disposed on the same side. As soon as a raised cam portion 23 is in front of the reflection coupler, the light emitted by the transmitter is reflected by the raised cam portion 23 and triggers the switching operation in the receiver. If no raised cam portion 23 is disposed in front of the reflection coupler, then the light emitted by the transmitter is not reflected and the switching operation is interrupted.

It will be appreciated that it is also possible to use switches based on other physical effects such as Hall sensors, reed contacts and so forth. It is also appropriate to use a combination of mechanical and electronic switches 22 if the level of reliability is to be increased. In the event of failure of a mechanical switch, the signal of the electronic switch can still trigger the desired procedure and at the same time a functional disturbance can be detected from the difference between the signals of the two switches (more specifically for example by virtue of the absence of the signal from the mechanical switch), and the procedure for eliminating the functional disturbance can thus be initiated without the basic operability of the switching apparatus suffering.

In order to achieve an unambiguous and well-defined switching characteristic, each switch can have a hysteresis between the switching-on and the switching-off points. Depending on the nature of the switch that hysteresis can be produced mechanically (for example by a quick-break switch) and/or electronically (for example by a Schmitt trigger). In addition, it is possible to provide a device which checks in particular the plausibility of the switching signals, for example by a comparison of parallel switches and/or a predetermined actuating sequence, and if necessary triggers a corresponding signalling procedure. That device may include for example discrete and/or integrated digital circuits and in particular a microcontroller or a microprocessor.

In addition, in FIG. 7 the first actuating guide portion 19 and the second actuating guide portion 20 are moved into the same radial plane and thus form a unit in the side view.

Figure 8:
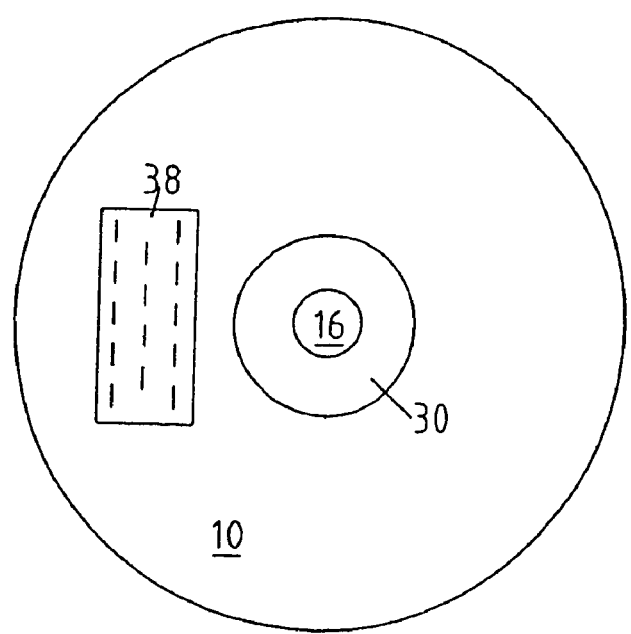
FIG. 8 shows a view of an outside of the base plate.

FIG. 8 is a view of the outside of a base plate 10 with the centrally illustrated actuating shaft 16 and the connecting sleeve 30 extending therearound. Provided beside that connecting sleeve 30 is a plug connector 38. The plug connector 38 is fixedly mounted and fitted with the electrical connections through a suitable orifice in the base plate 10, from the inside of the switching apparatus. Replacement of the switching apparatus can thereby be effected without simultaneously replacing the connecting cables for the switching apparatus and vice-versa, and that therefore simplifies the working operations involved.

In the illustrated embodiment the plug connector is in the form of a three-row, 14-pole plug connector. The illustrated contacts are similar to so-called blade contacts, in which respect the plug connector can be both in the form of a socket and also in the form of a male plug. It will be appreciated that the embodiment is also not limited to blade contacts. Rather, it is possible to use any suitable kind of plug connector.

Figure 9:
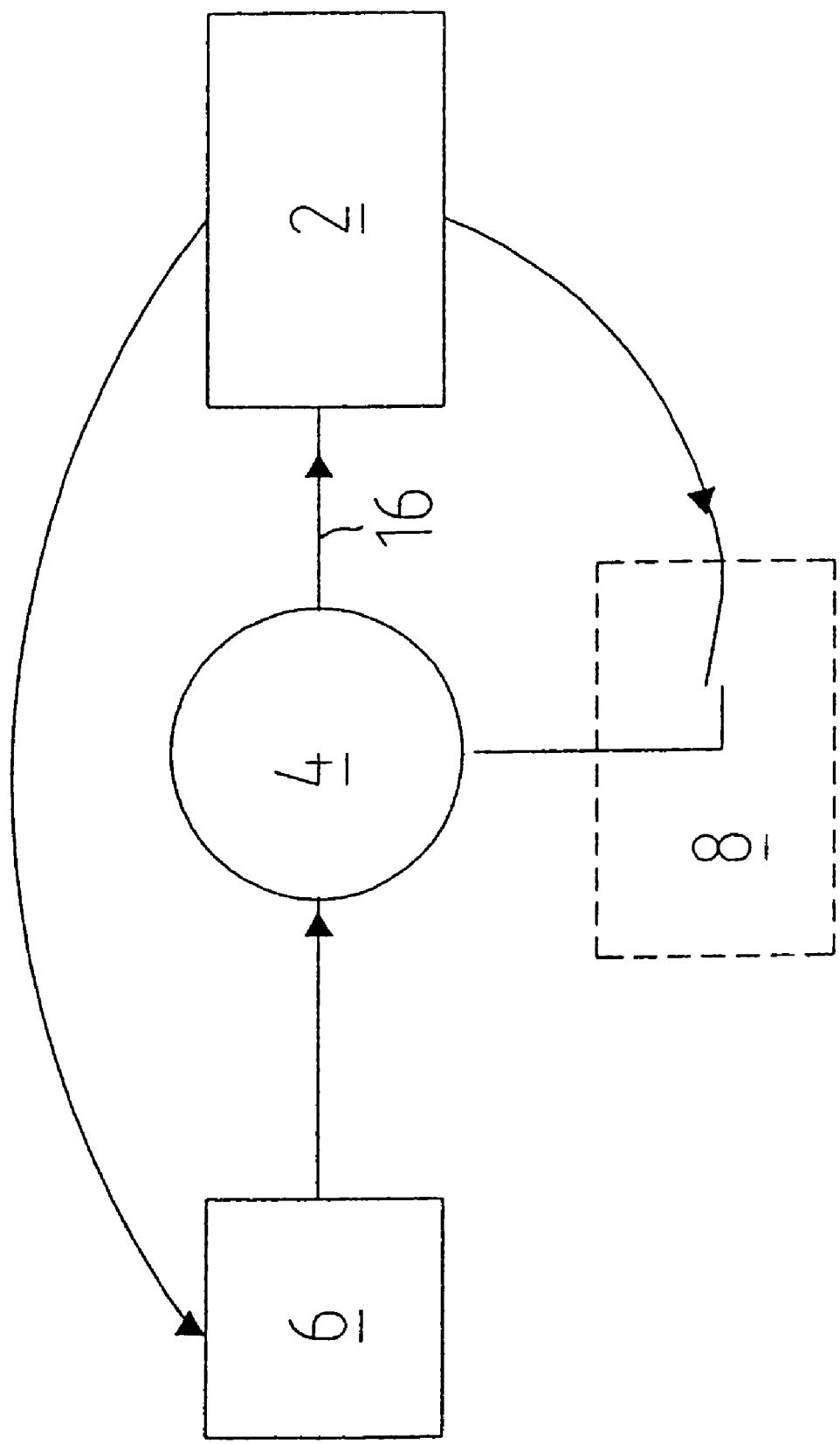
FIG. 9 is a general sketch of the regulation according to the invention.
Figure 10:
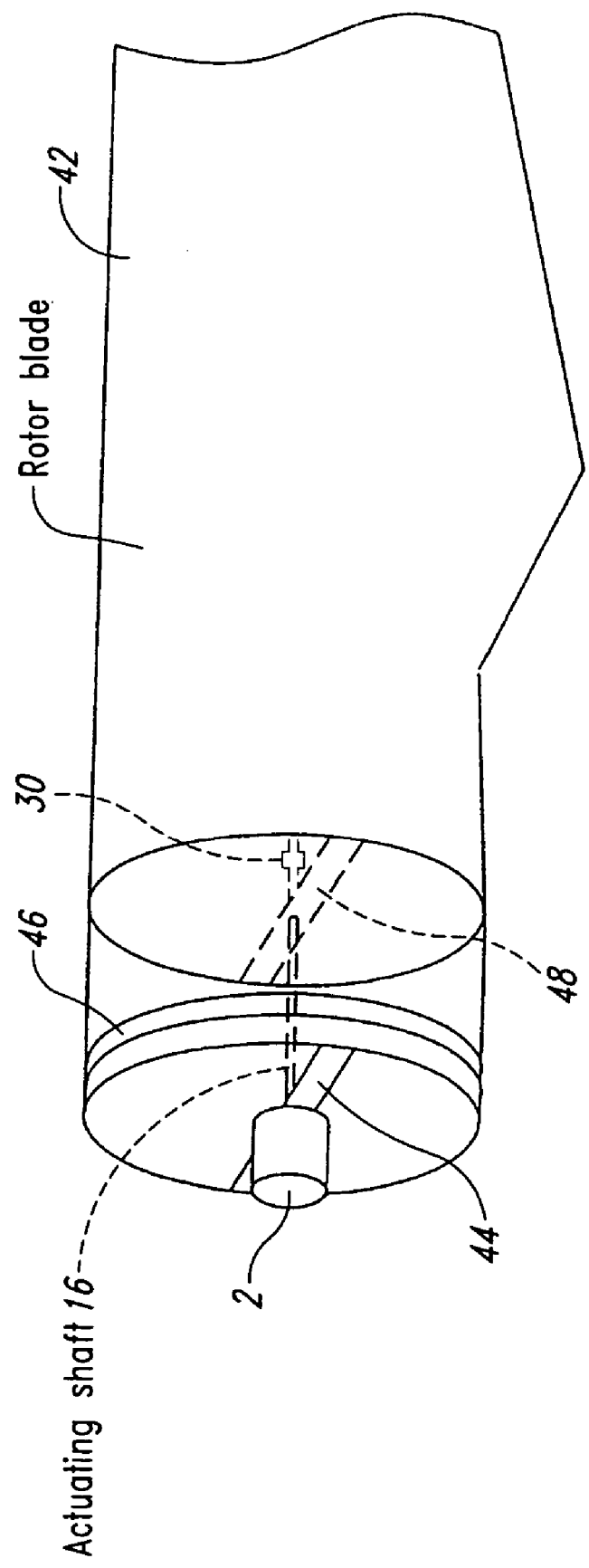
FIG. 10 shows a view of the structure according to the invention.

Viewing FIGS. 9 and 10 together, FIG. 9 shows schematically the interconnection between a control 6 of a rotor blade 42, the drive 4 for pitch adjustment of the rotor blade 42 as well as the compact limit switch 2 and the switching apparatus 8 which is controlled by the compact limit switch 2 and which is also in the form of a relay. The drive 4 is a motor assembly coupled to the rotor blade 42 to cause rotation of the blade 42 and change its pitch to a desired location. As will be seen, the drive 4 for changing the pitch and adjustment of the rotor blade 42 is controlled by the control device 6. It predetermines for the rotor blade 42 its angular orientation which, depending on the respective wind conditions, is directed at the optimum, which is predetermined by the control system 6. For the situation involving shutting down the installation, this can also mean that the rotor blade 42 is moved into the feathered position, while at other times it may be at partial power or full power pitch positions. As will also be seen, the rotor blade 42 is rigidly connected to the shaft 16 so that as the blade 42 is rotated to change the pitch, the shaft 16 is also caused to rotate. Therefore, pitch position of the blade 42, by way of the actuating shaft 16, controls the position of the arcuate portion 20 of the switch 2. If, during rotation, one of the projections 23 of the switch 2 comes into contact with the switch 22, then by way thereof the switching function of the switching apparatus 8 is triggered and the drive is switched off. The control device 6 also receives a signal from the compact limit switch 2 and can accordingly control the drive 4 in the desired manner, so that damage to the rotor blade is prevented.

FIG. 10 shows the arrangement of the switch 2 in conjunction with the rotor blade. It will be seen in this respect that the limit switch 2 is arranged on a holding device 44 on one side of the pitch bearing. The limit switch and housing 36 are always stationary when the rotor blade moves while the shaft 16 rotates as the rotor blade is rotated to change its pitch. By way of the actuating shaft 16, the switch 2 is connected by sleeve connector 30 to the rotor blade 42, with a suitable holder 48 at the end of the shaft 16. When the rotor blade rotates, that automatically results in corresponding rotation of the shaft and a corresponding switch position in the compact limit switch 2.

A wind power installation uses the at least one switching apparatus. A rotor of the wind power installation comprises at least one rotor blade of which the switching apparatus is adapted to detect a pitch.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation having at least one switching apparatus for arrangement in a rotor blade of a wind power installation wherein the switching apparatus is activated when the switching apparatus has assumed a given switching position, said switching apparatus comprising:
    an actuating shaft which is rigidly connectable to the rotor blade;
    an actuator and at least one switch, wherein the actuator and the switch are disposed in a housing and the actuator is in the form of an actuator which is provided by at least one arcuate actuating guide and which is connected with a first actuating guide portion to the actuating shaft.

2. The wind power installation according to claim 1, wherein the arcuate actuating guide is a second actuating guide portion which arcuately embraces the actuating shaft at a predetermined spacing, wherein the arcuate portion faces with its inside towards the actuating shaft and on its outside has projections which upon movement and with suitable positioning co-operate with the switch.

3. The wind power installation according to claim 2 wherein
    upon a rotary movement of the actuating shaft, the projections touch a part of the switch.

4. The switching apparatus according to claim 2 wherein the arcuate portion of the second actuating guide portion extends completely around the actuating shaft to form a circular, arcuate portion.

5. The wind power installation according to claim 1, further including a plurality of switches along the direction of movement and/or the length of a second actuating guide portion.

6. The wind power installation according to claim 1, further including a plurality of actuating tracks for a plurality of switches, said tracks being arranged in mutually juxtaposed relationship over the length of a second actuating guide portion.

7. The switching apparatus according to claim 1 wherein at least one switch is an electronic switch.

8. The wind power installation according to claim 1, further including a base plate through which the actuating shaft is passed.

9. The wind power installation according to claim 8 wherein the actuating shaft extends a predetermined length on the side of the base plate remote from the actuating guide and terminates in a connecting sleeve.

10. The wind power installation according to claim 1, further including a first carrier plate which is mounted to a base plate and carries the switch or switches.

11. The wind power installation according to claim 1, further including:
a rotary sender actuated by means of the actuating shaft.

12. The wind power installation according to claim 11, further including a rotary sender shaft connected to the actuating shaft by a coupling.

13. The wind power installation according to claim 11, further including a common shaft for the actuating guide and the rotary sender.

14. The wind power installation according to claim 11, further including a second carrier plate to which the rotary sender is fixed.

15. The wind power installation according to claim 11 wherein the rotary sender is in the form of an incremental sender or a potentiometer.

16. The wind power installation according to claim 1, further including:
a bearing and the actuating shaft is guided through a base plate with the bearing.

17. The wind power installation according to claim 1, further including a cable ducting in a base plate.

18. The wind power installation according to claim 1, further including:
a plug connector fixed to the outside of the switching apparatus.

19. The wind power installation according to claim 1 wherein the housing includes a cover hood which is formed in one piece, having an opening closable by a base plate.

20. The wind power installation according to claim 1, further including a heating source within the internal space of the switching apparatus, which space is formed by a base plate and a cover hood.

21. The wind power installation according to claim 19, further including a sealing fit of the cover hood on the base plate.

22. The wind power installation according to claim 19, further including a predetermined minimum wall thickness of the cover hood and a shear-resistant connection between the base plate and the cover hood.

23. The wind power installation according to claim 1, further including a rotor having the at least one rotor blade, wherein the switching apparatus is adapted to detect a pitch of the rotor blade.

24. The wind power installation according to claim 23 wherein the actuating shaft of the switching apparatus, for detecting the pitch, is coupled to the rotor blade in such a way that a change in the pitch of the rotor blade causes a rotational movement of the actuating shaft.

25. The wind power installation according to claim 23, further including a pitch regulation which as a measuring member has the switching apparatus and is adapted to regulate the pitch of the rotor blade.

26. The wind power installation according to claim 25 wherein the pitch regulation has a regulator and as an adjusting member a pitch drive.

27. A wind power installation having at least one switching apparatus for arrangement in a rotor blade of a wind power installation wherein the switching apparatus is activated when the switching apparatus has assumed a given switching position, said switching apparatus comprising:
an actuating shaft which is rigidly connectable to the rotor blade,
an actuator and at least one switch, wherein the actuator and the switch are disposed in a housing and the actuator includes a first actuating guide portion and a second actuating guide portion and the actuator is connected via the first actuating guide portion to the actuating shaft and
the second actuating guide portion which at least partially arcuately surrounds the actuating shaft at a predetermined spacing, and the arcuate portion faces with its inside towards the actuating shaft and on its outside has projections which upon movement and with suitable positioning, engage the at least one switch.

28. The wind power installation according to claim 27 wherein the second actuating guide portion is arcuate only and forms less than an entire circular member.

29. The wind power installation according to claim 27 wherein the second actuating guide is circular, forming a circular member.

* * * * *